3,267,159
PREPARATION OF 2,4,6-TRINITROBENZYL HALIDES
Kathryn G. Shipp, Silver Spring, Md., assignor to the United States of America as represented by the Secretary of the Navy
No Drawing. Filed Aug. 26, 1964, Ser. No. 392,352
6 Claims. (Cl. 260—646)

The invention described herein may be manufactured and used by or for the Government of the United States of America for governmental purposes without the payment of any royalties thereon or therefor.

This invention is directed to a new and improved method for the preparation of trinitrobenzyl halides.

Heretofore trinitrobenzyl bromide has been produced by the pressurized bromination of trinitrotoluene and trinitrobenzyl chloride has been produced by the further reaction of trinitrobenzyl bromide via trinitrotoluol and phosphorous pentachloride. This series of reactions was dangerous and involved tedious workup procedures.

It has now been found that the trinitrobenzyl halides may be prepared by a simple reaction involving trinitrotoluene and an alkali metal hypohalite. Thus, for example, the reaction of 2,4,6-trinitrotoluene with an alkali metal hypochlorite or an alkali metal hypobromite will yield the appropriate 2,4,6-trinitrobenzyl chloride or 2,4,6-trinitrobenzyl bromide.

The following examples are intended to illustrate specific embodiments of the invention and are not to be construed as limitations of the scope thereof.

*Example I*

This example illustrates the preparation of 2,4,6-trinitrobenzyl chloride.

A solution of 10 g. of TNT in 100 ml. tetrahydrofuran and 50 ml. methanol was chilled to 0° C. and then added quickly, with thorough mixing, to 100 ml. of a 5% aqueous solution of sodium hypochlorite which had also been chilled to 0° C. The temperature of the mixture rose rapidly but was held at approximately 15° C. or under in a mixture of ice/salt. After one minute, when the temperature began to drop, the reaction was stopped by drowning the mixture in about 1 liter of water containing 10 ml. of concentrated hydrochloric acid. A waxy crystalline product began to separate almost immediately and this precipitation was complete in about an hour at which time the product was filtered off, washed with water and dried. The 2,4,6-trinitrobenzyl chloride obtained weighed 10 g. (85% of theoretical). Recrystallized from benzene-hexane, the product was a cream-colored powdery material melting at 85° C. Identification was confirmed by infrared spectrometry.

*Example II*

This example illustrates the preparation of 2,4,6-trinitrobenzyl bromide.

A quantity of 4 g. of trinitrotoluene dissolved in 50 ml. tetrahydrofuran and 25 ml. methanol was chilled to 0° C. and added rapidly with shaking to 50 ml. of sodium hypobromite which had been chilled to 0° C. The solutions were mixed thoroughly and shaken with continued chilling in an ice/salt bath for one minute and then quenched by adding approximately 1 liter of ice water containing 5 ml. concentrated hydrochloric acid. The mixture was allowed to stand until the gummy product separated. The water was then decanted and the product was washed with water and then dissolved in benzene, dried over magnesium sulfate, filtered, evaporated to smaller volume, and n-hexane was added in equal volume. The solution was then allowed to stand and 2,4,6-trinitrobenzyl bromide separated as a crystalline product, was filtered off and dried. The crystalline product had a melting point of about 60° C. and mixture of the sample with an authentic sample of trinitrobenzyl bromide did not depress the melting point thereof.

It should be noted, that diluents other than tetrahydrofuran and methanol may be used in the above procedures.

In lieu of the 5% aqueous sodium hypochlorite solution illustrated in the above examples, a 7.5% aqueous sodium hypochlorite solution produced by the reaction of sodium hydroxide with chlorine may be used or the commercial product sold as Clorox (5% aqueous sodium hypochlorite solution) may be used. Other synthesized and commercially available preparations of sodium and/or potassium hypochlorite ranging in concentration from about 5% to about 12% hypochlorite salt may be used in the process of this invention.

Obviously many modifications and variations of the present invention are possible in the light of the above teachings. It is therefore to be understood that, within the scope of the appended claims, the invention may be practiced otherwise than as specifically described.

Having thus described the invention, what is claimed and desired to be secured by Letters Patent of the United States is:

1. The method of preparing trinitrobenzyl halides which comprises reacting a solution of trinitrotoluene in a diluent therefore with an aqueous solution of an alkali metal hypohalite.

2. The method of claim 1 wherein said trinitrotoluene is 2,4,6 - trinitrotoluene, said alkali metal hypohalite is selected from the group consisting of sodium hypochlorite, potassium hypochlorite and sodium hypobromite and said trinitrobenzyl halide is selected from the group consisting of 2,4,6-trinitrobenzyl chloride and 2,4,6-trinitrobenzyl bromide.

3. The method of claim 2 wherein said reaction is performed at a temperature between about 0° C. and 15° C.

4. The method of claim 3 wherein said alkali metal hypohalite is sodium hypochlorite and said trinitrobenzyl halide is 2,4,6-trinitrobenzyl chloride.

5. The method of claim 3 wherein said alkali metal hypohalite is potassium hypochlorite and said trinitrobenzyl halide is 2,4,6-trinitrobenzyl chloride.

6. The method of claim 3 wherein said alkali metal hypohalite is sodium hypobromite and said trinitrobenzyl halide is 2,4,6-trinitrobenzyl bromide.

No references cited.

BENJAMIN R. PADGETT, *Acting Primary Examiner.*

L. A. SEBASTIAN, *Assistant Examiner.*